3,231,333
PREPARATION OF BORANES
Herbert Jenkner, Hannover-Wulfel, Germany, assignor to Kali-Chemie Aktiengesellschaft, Hannover, Germany
No Drawing. Filed Sept. 1, 1960, Ser. No. 53,368
Claims priority, application Germany, Sept. 2, 1959
K 38,604
6 Claims. (Cl. 23—204)

The invention relates to the preparation of boranes.

It is a principal object of the invention to provide a method for the production of boranes which avoids the necessity of using solid starting materials of low reactivity and large amounts of hazardous ethers.

According to the invention, boranes are readily obtained by reacting boron halide compounds, particularly boron chlorides, with organic silicon hydrides, whereby in addition to diborane only liquid or low melting organic boron hydride compounds are obtained. A typical reaction according to the invention may be illustrated by the equation (1) $\quad 3R_2SiH_2 + 2BCl_3 \rightarrow 3R_2SiCl_2 + B_2H_6$ where R designates an alkyl or aryl group which may also be substituted. It is also possible to use as starting material an organosiloxane or organopolysiloxane if it contains at least one $$-\underset{|}{\overset{|}{Si}}-H-$$

group, such as $$(CH_3SiO)_4$$
$$\underset{H}{|}$$

The exchange of hydrogen against halogen at the silicon atom occurs stepwise; by stoichiometric dosage of the reactants it is possible to stop the reaction at the various stages in order to obtain organosilicon halides and halogenated organo-substituted silanes besides the boranes, which organosilicon compounds are otherwise often difficult to prepare. The Equation 1 may, therefore, be divided into the following two steps which may be actually realized:

(2) $\quad 3R_2SiH_2 + BCl_3 \rightarrow 3R_2SiHCl_2 + \frac{1}{2}B_2H_6$
(3) $\quad 3R_2SiHCl_2 + BCl_3 \rightarrow 3R_2SiCl_2 + \frac{1}{2}B_2H_6$ The formed organosilicon halides are readily reconverted to the original organosilicon hydrides by means of alkali metal hydride activated with an organoboron or organoaluminum compound, as described in my Patent No. 3,043,857, for "Preparation of Hydrides of the Fourth and Fifth Group Elements" and may then be recycled into the system.

Due to such easy and continuous regenerability of the organosilicon halides into the corresponding hydrides by means of activated alkali metal hydride, the organosilicon hydrides act essentially as hydrogen transmitters while the alkali metal hydride acts as hydrogen source. Therefore, such overall reaction may be represented by the following equations:

(4) $\quad 2RSiH_3 + 2BCl_3 \rightarrow B_2H_6 + 2RSiCl_3$ (5) $\quad 2RSiCl_3 + 6NaH \xrightarrow{\text{activator}} 2RSiH_3 + 6NaCl$ (6) $\quad 2BCl_3 + 6NaH \rightarrow B_2H_6 + 6NaCl$ Equation 6 shows that boron hydride compounds may be prepared from boron halide compounds and alkali metal hydrides whereby the organic silicon hydrides are recycled and only the small unavoidable losses thereof have to be replaced.

The method of the invention is simple in operation because, due to the liquid or gaseous state of the starting materials and end products, no solid compounds are to be dealt with. The yields are almost quantitative. Solvents or diluents are not necessary but may be sometimes of advantage. Already at room or slightly elevated temperature, the reaction proceeds smoothly. At temperatures above 80° C., particularly above 130° C., higher boranes are formed, and it seems that the formed organosilicon halide, together with boron halide still present, favors their formation.

Suitable starting materials are silicon compounds which contain at least one organic radical and at least one hydrogen atom bound to silicon. Such compounds are mono-, di-, or triorgano silicon tri-, di-, or monohydrides, which may also be substituted. I prefer to use the triorganosiliconmonohydrides and the diorganosilicondihydrides, or mixtures thereof.

The organic radicals are preferably alkyl, such as methyl, ethyl, propyl, butyl, and also higher alkyls such as octyl or dodecyl. The alkyl group may be substituted, and compounds like chloroethyl diethyl silane $$(-C_2H_5)_2(C_2H_4Cl)SiH$$

may be used.

As boron halide compounds, all compounds may be used which contain a boron-halogen linkage. I prefer to use the chlorides but other halides such as the bromides may also be used. In addition to the preferred boron trihalides, also diorganoboron monohalides or organoboron dihalides may be employed, which produce the corresponding organoboron hydride compounds.

The reactions have to be carried out in an inert atmosphere with the usual precautions well established in the art of handling organometallic compounds which are decomposed by moisture and oxygen.

The following examples illustrate the invention. All parts are given by weight, unless indicated otherwise.

*Example 1*

33.9 parts of boron trichloride were introduced into 75 parts of diethyl silane kept in a three-neck glass flask in a nitrogen atmosphere. The temperature of the exothermic reaction was maintained at 60° C. The developed diborane was introduced into triethylamine, and 28.5 parts of N-triethyl borazan were obtained, corresponding to a yield of 89 percent.

Into the diethylchlorosilane obtained in the first step of the reaction, there were introduced at the same temperature 34 parts of boron trichloride, and the formed diborane was also absorbed in triethylamine. There were obtained 25.9 parts of N-thiethyl borazan, corresponding to 81 percent of the theory. In total, 54.4 parts of N-triethyl borazan were obtained, corresponding to a diborane yield of 85 percent.

The reaction residue distilled between 128 and 130° C. and consisted of pure diethyldichlorosilane, which could be reconverted to diethyl silane by means of activated sodium hydride according to the method disclosed in my Patent No. 3,043,857.

Said diethyl silane could then be reacted again with fresh boron trichloride.

The reaction proceeded according to the equations:

First step:
$\quad 3(C_2H_5)_2SiH_2 + BCl_3 \rightarrow 3(C_2H_5)_2SiHCl + \frac{1}{2}B_2H_6$ Second step:
$\quad 3(C_2H_5)_2SiHCl + BCl_3 \rightarrow 3(C_2H_5)_2SiCl_2 + \frac{1}{2}B_2H_6$ $\quad 3(C_2H_5)_2SiH_2 + 2BCl_3 \rightarrow 3(C_2H_5)_2SiCl_2 + B_2H_6$

*Example 2*

108 parts of $BCl_3$ were passed at a temperature of about 60 to 75° C. into 347 parts of triethyl silane. For determination of the yield, the formed diborane was introduced, like in the preceding example, into 140 parts of triethylamine. After separation from the excess triethylamine, 95 parts (=89.5% of theory) of $BH_3N(C_2H_5)_3$ were obtained.

The triethylchlorosilane, formed in the reaction from the triethylsilane, could be reconverted to the triethyl silane by means of activated sodium hydride.

In addition to diborane, the reaction produced about 3 parts of higher boron hydrides, particularly pentaborane (B.P.=58° C.).

*Example 3*

10.8 parts of boron tribromide were added dropwise to 15 parts of triethyl silane. In an exothermic reaction, diborane was formed at a temperature of 100 to 120° C. and introduced into triethylamine to determine the yield. There were obtained 4.45 parts of N-triethyl borazan, corresponding to a yield of 90 percent.

*Example 4*

Gaseous trimethyl silane and gaseous boron trichloride were passed in the stoichiometric proportion of 3 moles to 1 mole through a reaction zone heated at a temperature of 20 to 150° C. Diborane was obtained in a yield of more than 90 percent.

*Example 5*

15 parts of diphenyl silane were heated at 60 to 90° C. and reacted with 6.4 parts of boron trichloride. In order to determine the yield, the obtained diborane was passed into triethylamine. 2 parts of N-triethyl borazan were obtained, corresponding to a diborane yield of 31 percent of theory.

I claim:

1. A process for preparing boranes comprising reacting an organosilicon hydride of the formula $R_x^1SiH_{4-x}$ wherein $R^1$ is a member of the group consisting of alkyl and aryl, and X is an integer from 1 to 3, with a boron halide compound $BX_3$ wherein X is a member of the group consisting of chlorine and bromine.

2. A process as claimed in claim 1 wherein three moles of a compound $R_2^1SiH_2$ are reacted with two moles of said boron halide compound.

3. The process as claimed in claim 1 wherein at least 3 moles of said organosilicon hydride are used for each mole of said boron halide compound, thereby producing an organic silicon halogen hydride in addition to diborane.

4. A process as claimed in claim 1 wherein at least one of said $R^1$ groups is replaced by halogenated alkyl.

5. A method for preparing diborane comprising reacting at a temperature of about 20 to 150° C. boron trichloride with an organosilane of the formula $R_xSiH_{4-x}$, wherein R is alkyl and $x$ is an integer from 1 to 3, and recovering the obtained diborane.

6. A process for preparing boranes comprising reacting a halogen-free organopolysiloxane which contains at least one Si—H group, with a boron halide compound $BX_3$ wherein X is a member of the group consisting of chlorine and bromine.

References Cited by the Examiner

UNITED STATES PATENTS

| | | | |
|---|---|---|---|
| 2,543,511 | 2/1951 | Schlesinger et al. | 23—204 |
| 2,900,225 | 8/1959 | Clasen | 23—204 X |
| 3,007,768 | 11/1961 | Edwards et al. | 23—204 X |

FOREIGN PATENTS

| | | |
|---|---|---|
| 1,079,600 | 4/1960 | Germany. |
| 823,438 | 11/1959 | Great Britain. |
| 589,719 | 3/1959 | Italy. |

OTHER REFERENCES

McCusker et al., "Journal of the American Chemical Society," vol. 80, pages 1103–1106 (1958).

Schaeffer et al., "Journal of the American Chemical Society," vol. 81, page 3486 (July 5, 1959).

Schechter et al., "Boron Hydrides and Related Compounds," prepared under Contract NOa(s) 10992 for Dept. of Navy, Bureau of Aeronautics, prepared by Callery Chemical Co., declassified December 1953, pp. 20–22.

BENJAMIN HENKIN, *Primary Examiner.*

MAURICE A. BRINDISI, *Examiner.*

M. WEISSMAN, E. C. THOMAS, *Assistant Examiners.*